March 8, 1938.  G. P. BODEE  2,110,459
SPECTACLES
Filed Oct. 31, 1935

INVENTOR.
George P. Bodee
BY
M. Talbert Dick
ATTORNEY.

Patented Mar. 8, 1938

2,110,459

UNITED STATES PATENT OFFICE 2,110,459

SPECTACLES

George P. Bodee, Chicago, Ill.

Application October 31, 1935, Serial No. 47,603

2 Claims. (Cl. 88—43)

The principal object of my invention is to provide a pair of spectacles that may be worn with great comfort.

A further object of this invention is to provide a pair of spectacles that does not leave the usual mark across the bridge of the nose of the user after they have been removed.

More specifically, the object of my invention is to provide a pair of spectacles that has a flexible resilient detachable support bridge for engagement with the bridge of the nose of the user and highly flexible bows.

A still further object of this invention is to provide comfortable spectacles that are economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Figure 1:
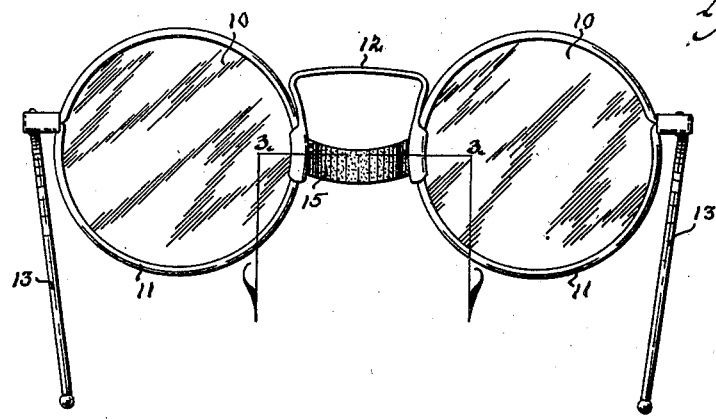
Fig. 1 is a front view of my spectacles ready for use.
Figure 2:
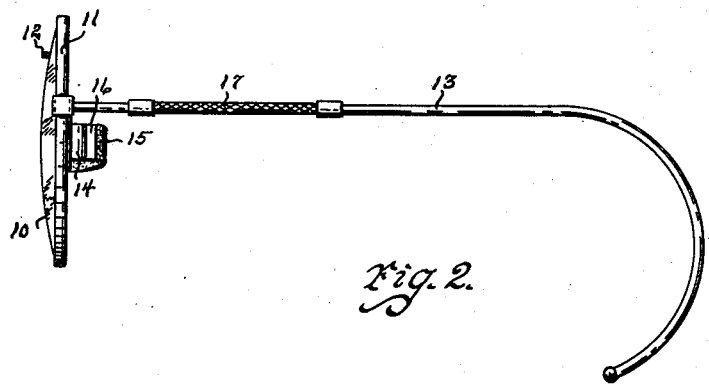
Fig. 2 is a side view of the spectacles and more fully illustrates their construction.

One of the chief objections to the wearing of glasses is the discomfort they give the user. Substantially all of the weight of the glasses is supported on the bridge of the nose and as the bridge of the glasses that engages the nose of the wearer is of metal, celluloid, or like hard rigid material, the wearer is constantly aware of weight. Also, the bridge of the spectacles is usually not shaped to conform to the particular outline of the nose of the user and even further discomfort is experienced. Although this discomfort from the wearing of glasses is continuous during normal wearing of the same, it is greatly increased if the wearer is a passenger in vibrating and jarring vehicles or like. I have overcome such objections by providing a pair of spectacles with a resilient, flexible nose piece, thereby not only giving great comfort to the user, but frictionally yieldingly engaging the nose and preventing the glasses from sliding down on the nose or getting out of proper adjustment on the head of the user.

Referring to the drawing, I have used the numeral 10 to designate the two lenses of the spectacles each embraced by a rim element 11. These two rim elements are held in spaced relationship by the connecting rigid bridge 12 which is merely a connecting member and not designed to engage the nose.

Figure 3:
Fig. 3 is a top plan sectional view of my spectacles taken on line 3—3 of Fig. 1.
Figure 4:
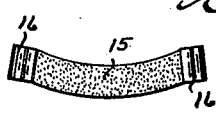
Fig. 4 is a front view of the detachable flexible resilient nose engaging element of my spectacles.

The numeral 13 designates the two bows connected to the two rim elements 11, respectively. It is to such a pair of spectacles that my invention is applied. The numeral 14 designates a dove-tailed vertical bearing element secured to each of the rim elements 11, as shown in Fig. 3. These two bearing elements 14 are located on the inner sides of the rim elements, below the bridge 12, and are diametrically opposite from each other with their vertical slot openings opening to the rear. The numeral 15 designates my flat resilient flexible supporting bridge ribbon element made of rubber or like. Preferably, it bows downwardly in its center portion, as shown in Fig. 4. The numeral 16 designates a beaded tongue element secured on each end of the element 15. These two end tongues are designed to slidably extend into the dove-tailed bearing members 14, respectively, as shown in Fig. 3. By this construction, the element 15 may be detached from the spectacles when desired by sliding the members 16 vertically from the members 14, but when the members 16 are in place in the grooves of the members 14 the ribbon element will extend naturally between the rims 11 in a plane below the rigid bridge 12, as shown in Fig. 1.

When the spectacles are in use this resilient flexible ribbon supporting the glasses will yieldingly rest on the bridge of the nose automatically conforming to the curvature of the bridge of the nose. This uniformly and evenly distributes the weight of the glasses on the nose and as the supporting ribbon 15 has considerable give, the weight of the glasses will not feel like the usual dead weight experienced in the usual type of spectacles. The elasticity of the member 15 will also automatically compensate for any slight variations in the proper size or fit of the glasses on the subject. Furthermore, the member 15 will frictionally grip the bridge of the nose, thereby preventing the glasses from sliding down on the nose during wear.

To further add to the comfort in the wearing of spectacles, I have imposed a flexible section 17 in each of the bows 13. These members 17 may be a strand of braided cord or like. By the use of the member 15 and members 17 the glasses will automatically assume a normal proper position in front of the eyes. During the wearing of the glasses the lens and frame portions may be jarred, struck, or slightly moved without transferring the shock to the head of the user. The tendency, however, of the glasses after being so disarranged will be to return to a normal position before the eyes.

When I use the words "lens" or "lenses" I have in mind all types of transparent or translucent glass or like used in spectacles, goggles, driving glasses, sun glasses, etc.

Some changes may be made in the construction and arrangement of my improved spectacles without departing from the real spirit and purpose of my invention, and it is my intention to cover by my claims any modified forms of structure or use of mechanical equivalents which may be reasonably included within their scope.

I claim:

1. In a device of the class described, two spectacle glass elements, a rigid bridge member holding said two glass elements in spaced relationship, and a flat elongated elastic ribbon downwardly bowed at its center extending between said two glass elements and designed to engage the bridge of the nose of a user.

2. In a device of the class described, a spectacle frame having a rigid bridge, two spaced apart, dove-tailed, substantially vertical bearing elements on said spectacle frame, a flexible bridge element, a beaded tongue element secured on each end of said flexible bridge element; said two beaded tongue elements detachably slidably engaging said two dove-tailed bearing elements, respectively; said flexible bridge element designed to engage the bridge of the nose of the user for aiding in the support of said spectacle frame.

GEORGE P. BODEE.